United States Patent [19]

Buczkowski et al.

[11] Patent Number: 4,535,389

[45] Date of Patent: Aug. 13, 1985

[54] ELECTROLYTIC CAPACITOR

[75] Inventors: Gary J. Buczkowski; E. James Fresia, both of Williamstown, Mass.

[73] Assignee: Sprague Electric Company, North Adams, Mass.

[21] Appl. No.: 652,998

[22] Filed: Sep. 21, 1984

[51] Int. Cl.³ ............................................. H01G 9/02
[52] U.S. Cl. .................... 361/433; 29/570; 252/62.2
[58] Field of Search ......................... 361/433; 29/570; 252/62.2

[56] References Cited

U.S. PATENT DOCUMENTS 2,024,210 12/1935 Edelman .............................. 361/433
4,024,442 5/1977 Anderson ............................ 361/433

FOREIGN PATENT DOCUMENTS 52-8501 3/1977 Japan.

Primary Examiner—L. T. Hix
Assistant Examiner—Douglas S. Lee

[57] ABSTRACT

An electrolytic capacitor having a wound foil capacitor section, preferably aluminum foil, contains as electrolyte a solution of 3 to 10 wt % ammonium benzoate, 4 to 16 wt % water, and 75 to 93 wt % ethylene glycol which has a resistivity of 385 to 620 ohm-cm and provides a capacitor capable of operating above 100 V and above 85° C. A nitro compound and a phosphate may also be present. The electrolyte is particularly suited for operation above 200 V and 95° C. and higher.

5 Claims, 2 Drawing Figures

ELECTROLYTIC CAPACITOR

BACKGROUND OF THE INVENTION

This invention relates to an electrolytic capacitor containing a wound foil section, preferably an aluminum one, which utilizes as electrolyte a solution of 3 to 10 wt% ammonium benzoate, 4 to 16 wt% water, and 75 to 93 wt% ethylene glycol. The electrolyte has a resistivity of 385 to 620 ohm-cm and is suitable for capacitors operating above 100 V, preferably above 200 V, and above 85° C., preferably 95° C. and higher. A nitro compound and a phosphate may also be present.

Ammonium benzoate-ethylene glycol electrolytes have been used in capacitors for low-voltage use. These electrolytes have contained little, if any, water and relatively large amounts of solute. They are low-resistivity electrolytes and have good low-temperature properties. Amine salts of benzoic acid, particularly the tertiary aliphatic salts, have been used in electrolytes for AC motor start capacitors. They have a much higher resistivity, e.g., about 800 ohm-cm, and are suitable for the heavy duty thermal cycling conditions encountered by AC motor start capacitors. They too have contained at most minor amounts of water.

In the past, low-voltage capacitors have used low-resistivity electrolytes, e.g., 300Ω-cm or less, intermediate voltage capacitors have used intermediate resistivity electrolytes, e.g., 200–250 V capacitors have used 700–800Ω-cm electrolytes, and high-voltage capacitors, high-resistivity electrolytes, e.g., 1000Ω-cm and above.

SUMMARY OF THE INVENTION

This invention features a wound foil electrolytic capacitor, preferably an aluminum one, which contains as electrolyte a solution of 3 to 10 wt% ammonium benzoate, 4 to 16 wt% water, and 75 to 93 wt% ethylene glycol. This electrolyte has a room-temperature resistivity of 385 to 620 ohm-cm but still can be used in capacitors rated above 100 V and above 85° C. and, specifically, as high as 250 V and 105° C. A nitro compound and a phosphate may also be present.

Glycol-based electrolytes with resistivities in the 400 to 600 ohm-cm range, as is the electrolyte described above, are generally restricted in use to capacitors rated below 200 V and 95° C. It was, therefore, unexpected that this electrolyte could be used in 200 to 250 V capacitors operating at 95° to 105° C. This capability was demonstrated without the nitro compound, added as a depolarizer to prevent gassing, particularly at the higher temperatures. However, this nitro compound is preferably a non-ionizing nitro compound so that it will not react with the ammonium cation present in the electrolyte. The phosphate may be included to prevent cathode depassivation during storage, particularly at higher water contents.

DESCRIPTION OF THE PREFERRED EMBODIMENTS

Figure 1:
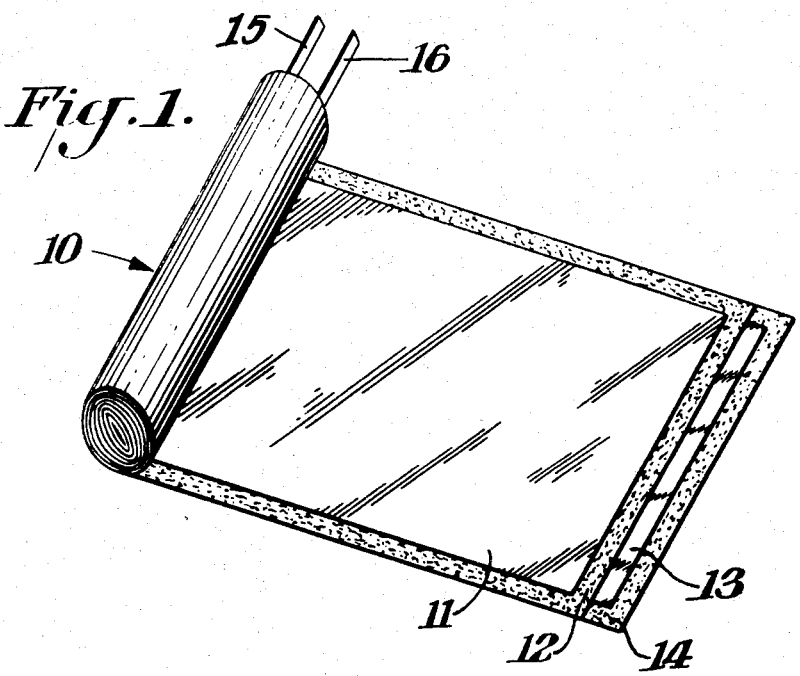
FIG. 1 shows a wound capacitor section partially unrolled.

An electrolytic capacitor has a wound capacitor section 10 with an anode foil 11 contiguously wound with a cathode foil 13 and interleaved spacer material 12 and 14. Anode foil 11 bears a barrier layer dielectric oxide on its surface, and cathode foil 13 may also bear such an oxide. Electrode tabs 15 and 16 are connected to anode foil 11 and cathode foil 13, respectively. They may extend from the same end of the section as shown in FIG. 1 or one from each end of the section as shown in FIG. 2.

Figure 2:
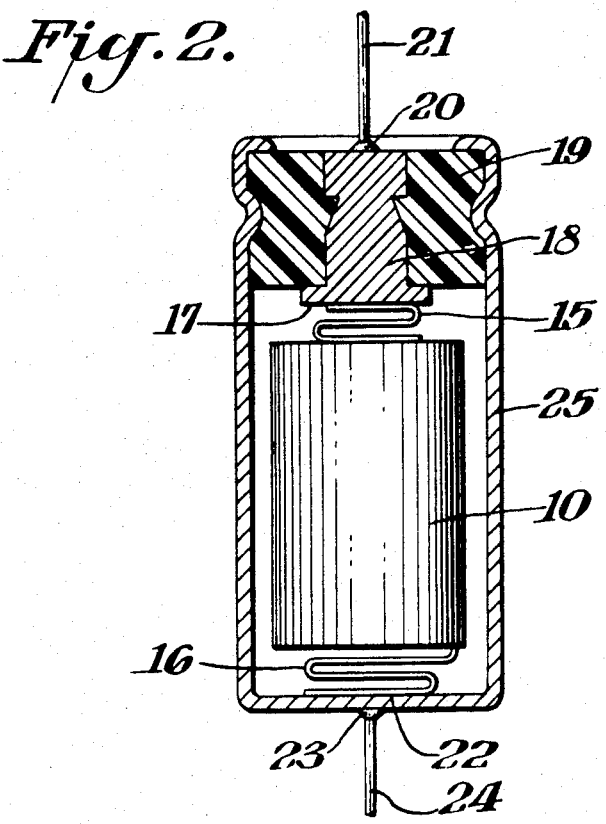
FIG. 2 shows a cross-sectional view of the capacitor of the present invention.

In FIG. 2, a cross-section of a capacitor is shown in which section 10 is located in metal container 25, preferably a can, and electrode tab 16 connects cathode 13 to the inside bottom of container 25 at 22, preferably via a weld. Tab 15 likewise connects anode 11 to the bottom of a metal terminal insert 18 at 17, again preferably via a weld. Insert 18 passes through an insulating closure or bung 19. External anode lead 21 is connected at 20, preferably a weld, to the top of insert 18. External cathode lead 24 is similarly connected at 23 to the outside of container 25. Section 10 is impregnated with the electrolyte of the present invention.

The electrolyte consists essentially of a solution of 3 to 10 wt% ammonium benzoate, 4 to 16 wt% water, 75 to 93 wt% ethylene glycol, 0 to 4 wt% of a nitro compound as depolarizer, and 0 to 0.5 wt% of a phosphate. The electrolyte has a room-temperature resistivity of 385 to 620 ohm-cm and permits capacitor operation above 85° C., preferably at 200 to 250 V and 95° to 105° C.

The nitro compound used is preferably non-ionizable so it will not react with the ammonium cation of the electrolyte. For example, p-nitrobenzoic acid has enjoyed use as a depolarizer but its ammonium salt is relatively insoluble and could precipitate out of the electrolyte solution during capacitor operation. For this reason, up to 4 wt% nitropropane or o-nitroanisole are preferred as depolarizer materials.

The phosphate may be present to prevent depassivation of the cathode foil during storage, particularly if it bears no or only a low-voltage dielectric oxide. A small amount, up to 0.5 wt% is used, and generally ammonium dihydrogen phosphate is used although other soluble phosphates may be used.

The following examples give data showing the usefulness of capacitors containing this electrolyte over a range of operating conditions. The water content was varied from 4 wt% to 16 wt%; however, as the data below shows, good results were obtainable at less than 16 wt% water and since higher concentration might cause problems at higher temperatures, lower amounts of water will be used most frequently.

EXAMPLE 1

The table below gives the composition in weight percent for 10 experimental electrolytes together with room-temperature resistivity in ohm-cm and maximum anodization voltage (V max) in volts measured on plain foil. Eight of these electrolytes were then tested in capacitors and the results are shown in subsequent examples. ADP stands for ammonium dihydrogen phosphate.

Although the maximum anodization voltage on plain foil of electrolytes containing the phosphate appear low, these can be used in 250 V capacitors as they will support anodization up to 400 V–500 V on anodized foil.

TABLE 1

| Electrolyte | 1 | 2 | 3 | 4 | 5 | 6 | 7 | 8 | 9 | 10 |
|---|---|---|---|---|---|---|---|---|---|---|
| Ethylene glycol | 89.9 | 92.0 | 89.0 | 88.9 | 85.5 | 85.4 | 77.0 | 81.0 | 86.9 | 87.0 |
| Ammonium benzoate | 4.0 | 4.0 | 7.0 | 7.0 | 7.0 | 7.0 | 7.0 | 7.0 | 7.0 | 7.0 |
| Water | 4.0 | 4.0 | 4.0 | 4.0 | 4.0 | 4.0 | 16.0 | 12.0 | 4.0 | 4.0 |
| ADP | 0.1 | — | — | 0.1 | — | 0.1 | — | — | 0.1 | — |
| Nitropropane | 2.0 | — | — | — | — | — | — | — | 2.0 | 2.0 |
| O—Nitroanisole | — | — | — | — | 3.5 | 3.5 | — | — | — | — |
| Ω-cm | 620 | 616 | 398 | 413 | 399 | 399 | 225 | 297 | 402 | 407 |
| V max | 218 | 386 | 407 | 217 | 396 | 211 | 410 | 398 | 220 | 360 |

EXAMPLE 2

Electrolytes 1 and 2 were evaluated in capacitors rated at 840 μF-250 V as to low-temperature characteristics, 500 hr shelf test for storage stability, and a 2000 hr life test, the latter two being conducted at 95° C. They were compared to a standard glycol-borate electrolyte (A) having a resistivity of 1140Ω-cm which has been the general resistivity used for up to 300 V ratings until now.

The shelf factor is an indication of the stability of the dielectric oxide in a particular electrolyte. The factor is calculated from capacitance values measured before and after exposure to the test temperature and the time required for the capacitor to build to the rated voltage at a constant current before and after test. The shelf factor is calculated by multiplying the ratio of the capacitance before and after testing by the ratio of the build time after testing to that before testing. A value of 1 would be perfect, and a value of 2 is considered acceptable.

The low-temperature test results give percent capacitance loss at −40° C. based on that at 25° C. and the ratio of the ESR values at −40° C. to 25° C.

TABLE 2

| Electrolyte | | A | 1 | 2 |
|---|---|---|---|---|
| Cap, μF | 0 hr | 846 | 853 | 855 |
|  | 2000 hr | 828 | 831 | 842 |
| % change | | −2.1 | −2.6 | −1.5 |
| ESR, m-ohms | 0 hr | 56.8 | 47.9 | 49.2 |
|  | 2000 hr | 91.8 | 61.0 | 68.2 |
| % change | | +62 | +27 | +39 |
| Leakage current, μA | 0 hr | 40 | 45 | 42 |
|  | 2000 hr | 61 | 56 | 61 |
| Shelf factor, | 500 hrs. | 3.7 | 1.4 | 1.6 |
| −40° C. Cap change | | −50 | −32 | −36 |
| ESR −40°/25° C. | | 69 | 44 | 60 |

The two experimental electrolytes which have a resistivity of about 600Ω-cm performed as well as and better than the standard 1100Ω-cm electrolyte. Electrolyte 1 and its counterpart without ADP were also evaluated in units rated at 1700 μF–250 V at the above conditions. The results were comparable to those above.

EXAMPLE 3

Capacitors with the same rating as those in Example 2 were subjected to the same tests as in Example 2 but at 105° C. In this series, electrolytes 3 to 6 with resistivities around 400Ω-cm were evaluated. In addition, weight loss in mg (a measure of capacitor life) and can bulge in inches (a measure of gassing) are given in the table below.

TABLE 3

| Electrolyte | | A | 3 | 4 | 5 | 6 |
|---|---|---|---|---|---|---|
| Cap, μF | 0 hr | 839 | 847 | 845 | 840 | 846 |
|  | 2000 hr | 821 | 824 | 832 | 772 | 804 |
| % change | | −2.2 | −2.6 | −1.6 | −8.1 | −5.0 |
| ESR | 0 hr | 96 | 65 | 65 | 65 | 65 |
|  | 2000 hr | 124 | 83 | 81 | 97 | 86 |
| % change | | +29 | +28 | +25 | +49 | +32 |
| Leakage current | 0 hr | 108 | 102 | 160 | 120 | 160 |
|  | 2000 hr | 59 | 37 | 42 | 41 | 36 |
| Wt. loss, | 2000 hr | 282 | 153 | 160 | 170 | 175 |
| Can bulge, | 2000 hr | 0.032 | 0.013 | 0.016 | 0.006 | 0.004 |
| Shelf factor, | 500 hr | 5.37 | 2.29 | 2.20 | 1.88 | 5.54 |
| −40° Cap change | | −56 | −9.8 | — | −9.1 | −8.7 |
| ESR −40°/25° C. | | 122 | 12.2 | — | 13.2 | 11.7 |

Again, the experimental electrolytes on the whole performed as well as the control even though their resistivity was roughly one-third of the control and prior experience would predict their failure.

EXAMPLE 4

Electrolytes 9 and 10 were evaluated in intermediate voltage capacitors rated at 180 μF-100 V at 105° C. and 125° C. as above. The control electrolyte (B) was a DMF-glycol electrolyte containing boric acid, citric acid and triethylamine which has a resistivity of 435Ω-cm. Results are given in the table below.

TABLE 4

| | B | | 9 | | 10 | |
|---|---|---|---|---|---|---|
| Electrolyte | 105° C. | 125° C. | 105° C. | 125° C. | 105° C. | 125° C. |
| Cap, μF | | | | | | |
| 0 hr | 195 | 196 | 194 | 195 | 195 | 194 |
| 2000 hr | 199 | 195 | 192 | 192 | 193 | 191 |
| % change | +2 | −5 | −1 | −2 | −1 | −2 |
| ESR | | | | | | |
| 0 hr | 150 | 126 | 146 | 135 | 143 | 140 |
| 2000 hr | 167 | 156 | 178 | 180 | 167 | 184 |
| % change | +11 | +24 | +22 | +33 | +17 | +31 |
| Leakage current | | | | | | |
| 0 hr | 4.7 | 3.4 | 4.2 | 4.5 | 4.0 | 4.2 |
| 2000 hr | 2.4 | 3.7 | 1.3 | 2.5 | 1.5 | 3.7 |
| Shelf factor, 500 hr | 1.05 | 1.07 | 1.16 | 1.30 | 1.07 | 1.26 |
| % Cap Retention −40° C. | 94 | 95 | 88 | 86 | 82 | 81 |
| ESR −40° C./25° C. | 5 | 4 | 64 | 66 | 98 | 118 |

Except for the low temperature properties, capacitors containing the experimental electrolytes performed as well as the control did.

Thus, capacitors containing the relatively low resistivity electrolytes of the present invention perform well at ratings above 100 V, and particularly, at 250 V, and at 95° C. and higher, e.g., up to at least 125° C. Such electrolytes may contain 3 to 10 wt% ammonium benzoate solute, although 4 to 7 wt% is preferred together with 4 wt% water and the balance, ethylene glycol. A nitro compound and/or phosphate may be added if desired.

What is claimed is:

1. An electrolytic capacitor comprising two contiguously wound foil electrodes with interleaved spacer material, at least one of said electrodes bearing a barrier layer dielectric oxide, said electrodes being in contact with an electrolyte consisting of 3 to 10 wt percent ammonium benzoate, 4 to 16 wt percent water, 75 to 93 wt percent ethylene glycol, 0 to 4 wt percent of a nitro compound as a depolarizer and 0 to 0.5 wt percent of a phosphate, said electrolyte having a resistivity of 385 to 620 ohm-cm and providing a capacitor capable of operation above 100 V and 95° C. and higher.

2. A capacitor according to claim 1 wherein said nitro compound is ortho-nitroanisole or nitropropane.

3. A capacitor according to claim 2 wherein said electrolyte contains 89 wt% ethylene glycol, 7 wt% ammonium benzoate, 4 wt% water, 0 to 3.5 wt% o-nitroanisole, and 0 to 0.1 wt% phosphate.

4. A capacitor according to claim 2 wherein said electrolyte contains 87 to 92 wt% ethylene glycol, 4 to 7 wt% ammonium benzoate, 4 wt% water, 0 to 2 wt% nitropropane and 0 to 0.1 wt% phosphate.

5. A capacitor according to claim 1 wherein said foil electrodes are aluminum foil.

* * * * *

UNITED STATES PATENT AND TRADEMARK OFFICE
CERTIFICATE OF CORRECTION

PATENT NO. : 4,535,389
DATED : August 13, 1985
INVENTOR(S) : Gary J. Buczkowski et al It is certified that error appears in the above—identified patent and that said Letters Patent is hereby corrected as shown below:

Column 3, line 31, "2" should read -- 3 --
Column 4, Table 4, under Electrolyte B, 125°C, % change,
         "-5" should read --   -.5   --

Signed and Sealed this

Twenty-second Day of October 1985

[SEAL]

Attest:

DONALD J. QUIGG

Attesting Officer

Commissioner of Patents and
Trademarks—Designate